United States Patent
Ha (10) Patent No.: US 6,175,919 B1
(45) Date of Patent: Jan. 16, 2001

(54) METHOD AND APPARATUS FOR UPGRADING BIOS USING A SERIAL COMMUNICATION

(75) Inventor: Jung-chul Ha, Suwon (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/071,032

(22) Filed: May 4, 1998

(30) Foreign Application Priority Data

May 2, 1997 (KR) .................................................. 97-17054

(51) Int. Cl.[7] ...................................................... G06F 13/14
(52) U.S. Cl. .................................. 713/100; 713/1; 713/2; 711/102; 711/104; 710/104; 709/213; 709/217
(58) Field of Search .................................. 713/1, 100, 2; 710/1, 46, 104; 709/220, 221, 217–219, 213; 711/102, 104

(56) References Cited

U.S. PATENT DOCUMENTS

| | | | |
|---|---|---|---|
| 4,270,205 | * 5/1981 | Deshon | 371/32 |
| 5,321,840 | * 6/1994 | Ahlin et al. | 395/700 |
| 5,325,529 | 6/1994 | Brown et al. . | |
| 5,388,267 | 2/1995 | Chan et al. . | |
| 5,519,843 | 5/1996 | Moran et al. . | |
| 5,522,076 | * 5/1996 | Dewa et al. | 395/700 |
| 5,535,357 | 7/1996 | Moran et al. . | |
| 5,535,419 | 7/1996 | O'Brien . | |
| 5,579,522 | * 11/1996 | Christeson | 713/2 |
| 5,603,056 | 2/1997 | Totani . | |
| 5,606,662 | * 2/1997 | Wisor | 395/185.01 |
| 5,675,748 | * 10/1997 | Ross | 713/100 |
| 5,727,207 | * 3/1998 | Gates | 713/100 |
| 5,734,898 | * 3/1998 | He | 707/203 |
| 5,752,042 | * 5/1998 | Cole et al. | 717/11 |
| 5,778,070 | * 7/1998 | Mattison | 380/25 |
| 5,826,015 | * 10/1998 | Schmidt | 713/201 |
| 5,960,445 | * 9/1999 | Tamori | 713/100 |
| 5,964,873 | * 10/1999 | Choi | 713/2 |
| 6,009,524 | * 12/1999 | Olarig | 713/200 |
| 6,026,016 | * 2/2000 | Gafken | 365/185.04 |

FOREIGN PATENT DOCUMENTS

| | | |
|---|---|---|
| 09330216 | * 12/1997 | (JP) . |
| 10083309 | * 3/1998 | (JP) . |
| 10214183 | * 8/1998 | (JP) . |

* cited by examiner

Primary Examiner—Thomas C. Lee
Assistant Examiner—Thuan Du
(74) Attorney, Agent, or Firm—Robert E. Bushnell, Esq.

(57) ABSTRACT

A method for upgrading a BIOS using serial communication is provided. In the method, it is possible to collectively upgrade the BIOS's of a plurality of computers using serial communication without using a floppy disk. The method includes the steps of: at a host computer, transferring predetermined BIOS upgrade software and BIOS image data corresponding to a computer to the computer through a selector using serial communication when the computer connected to the host computer through the selector requests the BIOS to be upgraded; and, at the computer which requested the BIOS to be upgraded, upgrading the BIOS by removing the existing BIOS stored in a BIOS ROM and writing the BIOS image data into the BIOS ROM by executing the received BIOS upgrade software. According to the present invention, it is possible to save time in upgrading the BIOS and to collectively upgrade the BIOS's of a plurality of computers.

14 Claims, 5 Drawing Sheets

METHOD AND APPARATUS FOR UPGRADING BIOS USING A SERIAL COMMUNICATION

CLAIMS OF PRIORITY

This application makes reference to, incorporates the same herein, and claims all benefits accruing under 35 U.S.C. §119 from an application for METHOD FOR UPGRADING BIOS USING A SERIAL COMMUNICATION earlier filed in the Korean Industrial Property Office on the May 2, 1997 and there duly assigned Ser. No. 17054/1997.

BACKGROUND OF THE INVENTION

1. Technical Field

The present invention relates to a basic input-output system (BIOS) of a computer, and more particularly, to a method and apparatus for upgrading the BIOS of a computer for upgrading an existing BIOS.

2. Related Art

Up to this point, methods for upgrading the BIOS of a computer have been burdened by several disadvantages. Typically, such methods involve the use of many floppy disks which have to be loaded into the computer in sequence since the BIOS has to be upgraded by floppy disk. The sequential loading of the floppy disks is accompanied by the necessity for the user to input commands using a keyboard. Thus, current systems for upgrading the BIOS of a computer consume much unnecessary time. There is also the disadvantage that the floppy disks must be stored, and this results in a waste of storage space.

Therefore, there is a need for the development of a method for upgrading the BIOS of a computer using another, less time-consuming technique. Specifically, there is a need for the development of a method for upgrading a BIOS using serial communication, so that it is possible to collectively upgrade the BIOS's of a plurality of computers, thereby saving time by using serial communication and not using a floppy disk.

The following patents are considered to be representative of the prior art, and are burdened by the disadvantages set forth herein: U.S. Pat. No. 5,603,056 to Totani, entitled *Disk Drive Control Computer And Method For Rewriting Control Program In Flash EEPROM With Serial Communication Using Unassigned Pins Of SCST Or ATA Connector*, U.S. Pat. No. 5,535,419 to O'Brien, entitled *System And Method For Merging Disk Change Data From A Floppy Disk Controller With Data Relating To AN IDE Drive Controller*, U.S. Pat. No. 5,535,357 to Moran et al., entitled *Flash Memory System Providing Both BIOS And User Storage Capability*, U.S. Pat. No. 5,519,843 to Moran et al., entitled *Flash Memory System Providing Both BIOS And User Storage Capability*, and U.S. Pat. No. 5,388,267 to Chan et al, entitled *Method And Apparatus For Updating And Restoring System BIOS Functions While Maintaining BIOS Integrity*.

SUMMARY OF THE INVENTION

It is an object of the present invention to provide a method and apparatus for upgrading a BIOS using serial communication so that it is possible to collectively upgrade the basic input-output systems (BIOS's) of a plurality of computers, and to save time by upgrading the BIOS using serial communication without need of a floppy disk.

To achieve the above object, there is provided a method and apparatus for upgrading a BIOS using a serial communication, comprising the steps and functions of:

at a host computer, transferring predetermined BIOS upgrade software and a BIOS image corresponding to a computer to the computer through a selecting means using serial communication when the computer connected to the host computer through the selecting means requests the BIOS to be upgraded; and at the computer which requested the BIOS to be upgraded, upgrading the BIOS by removing the existing BIOS stored in a BIOS ROM, and writing the BIOS image into the BIOS ROM by executing the received BIOS upgrade software.

It is preferable that the step of transferring the BIOS upgrade software and BIOS image executed in the host computer comprise the steps of:

continuously checking whether the BIOS is requested to be upgraded when the BIOS is not requested to be upgraded, and proceeding to the next step when the BIOS is requested to be upgraded after checking whether the computers have requested the BIOS to be upgraded;

obtaining a model ID from a corresponding computer when it is determined that the BIOS is requested to be upgraded during the step of checking whether upgrade of the BIOS has been requested;

loading predetermined BIOS images and BIOS upgrade software corresponding to the model ID into a memory;

transferring the BIOS images and BIOS upgrade software to the computers which requested the BIOS to be upgraded through the selecting means using serial communication;

displaying a transfer completion message for announcing that the transfer is completed; and returning to the step of checking whether the BIOS is requested to be upgraded when a program terminate command of a user is not input, and terminating the program when the program terminate command of the user is input after checking whether the program terminate command of the user is input.

It is preferable that the step or function of upgrading the BIOS executed in the computer which requested the BIOS to be upgraded comprise the steps or functions of:

starting the power on self test of the BIOS when the computer is booted;

proceeding with a general power-on self-test when it is determined that the computer is not connected to the host computer, and proceeding to the next step when it is determined that the computer is connected to the host computer after checking whether the computer is connected to the host computer;

requesting the host computer to upgrade the BIOS and transferring a model ID when it is determined that the host computer is connected to the computer during the step of checking whether the host computer is connected to the computer;

receiving BIOS images and BIOS upgrade software from the host computer and storing them in a memory; and removing an existing BIOS stored in a BIOS ROM by executing the BIOS upgrade software and writing the BIOS image into the BIOS ROM.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENT

Hereinafter, a preferred embodiment of a method and apparatus for upgrading a BIOS using a serial communication according to the present invention will be described with reference to the attached drawings.

Figure 1:
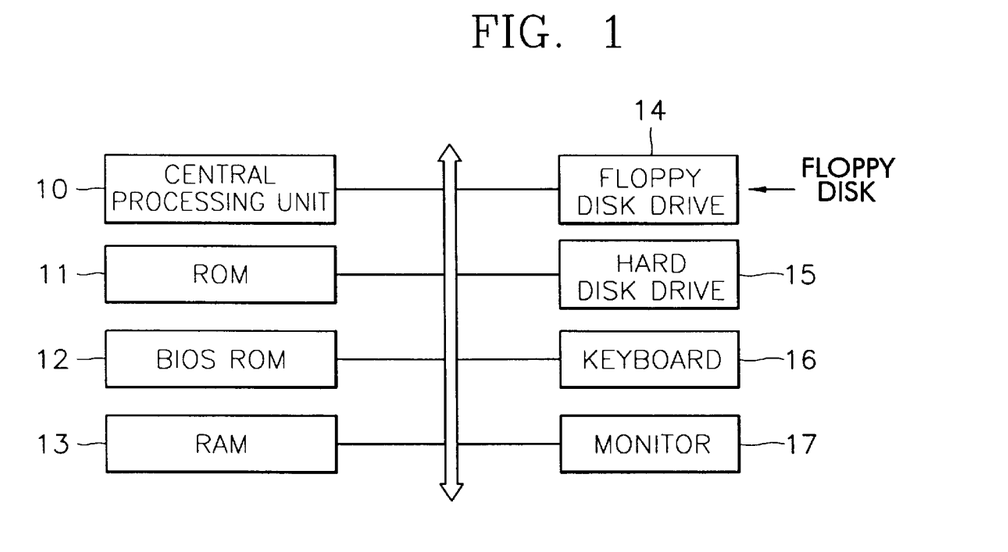
FIG. 1 is a block diagram of a general computer system.

FIG. 1 is a block diagram of a general computer system. As shown in FIG. 1, a computer system includes a central processing unit 10, read-only memory (ROM) 11, a BIOS ROM 12 for storing a BIOS, random access memory (RAM) 13 which is a main memory, a floppy disk drive 14 and a hard disk drive 15 which are auxiliary storage devices, a keyboard 16 which is an input device, and a monitor 17 which is an output display device.

Figure 2:
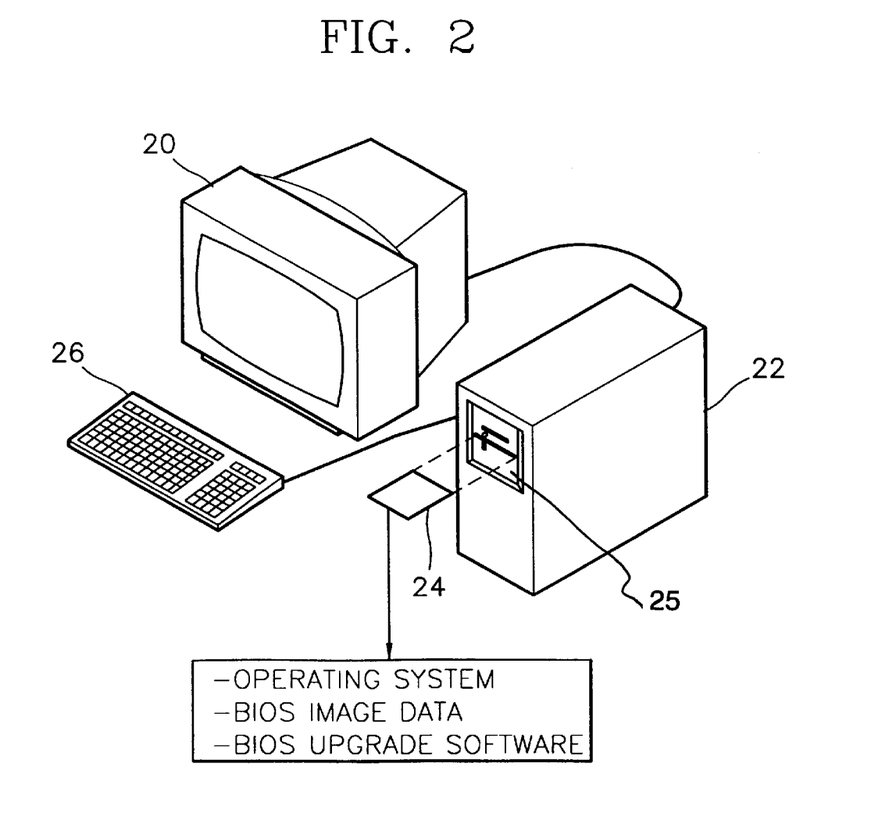
FIG. 2 is an exterior view of a computer system for describing a method for upgrading a BIOS.

Also, FIG. 2 shows an exterior view of a computer system for use in describing a method for upgrading a BIOS. The computer system shown in FIG. 2 includes: a computer main body 22 having a central processing unit, an ROM, a BIOS ROM, an RAM which is a main memory, a floppy disk drive and a hard disk drive; a monitor 20; and a keyboard 26. A user upgrades the BIOS of the computer system using an operating system, BIOS image data, and a BIOS upgrade software program by inserting a floppy disk 24 into a floppy disk drive 25 built into the computer main body 22.

Figure 3:
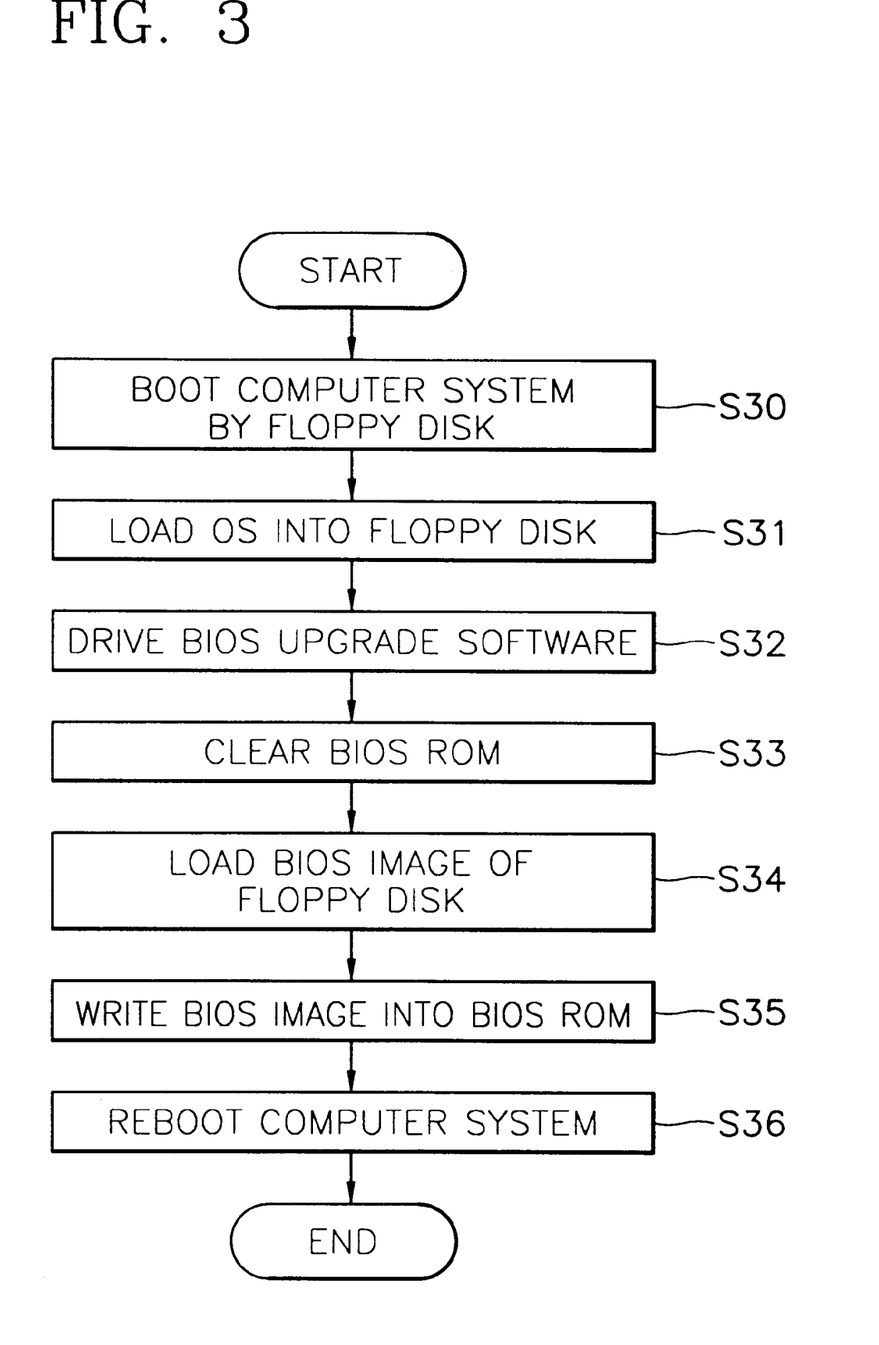
FIG. 3 is a circuit diagram showing a method for upgrading a BIOS.

FIG. 3 shows a method for upgrading a BIOS stored in the BIOS ROM 12 in the computer system shown in FIG. 1. Referring to FIG. 3, in the method for upgrading the BIOS, a floppy disk including BIOS upgrade software and a BIOS image is inserted into the floppy disk drive 14 (FIG. 1) and the computer system is booted by the floppy disk in step S30. Then, an operating system (OS) included in the floppy disk is loaded in step S31. The BIOS upgrade software included in the floppy disk is driven or executed in step S32. The BIOS ROM 12 is cleared by the driven BIOS upgrade software and the BIOS stored in the BIOS ROM 12 is removed in step S33. The BIOS image included in the floppy disk is loaded into the RAM 13 which is a main memory in step S34. Here, a flash ROM, in which both reading and writing is possible, is generally used as the BIOS ROM 12. The loaded BIOS image is written into the BIOS ROM 12 in step S35. A BIOS upgrade is completed by rebooting the computer system in step S36.

In the above-mentioned method for upgrading the BIOS, many floppy disks have to be loaded since the BIOS should be upgraded by the floppy disk and a user should input a command using a keyboard and operate it when driving the BIOS upgrade software. Also, it takes much time to upgrade the BIOS due to the time required for loading the floppy disks since the operating system and the BIOS image have to be loaded by floppy disk.

Figure 4:
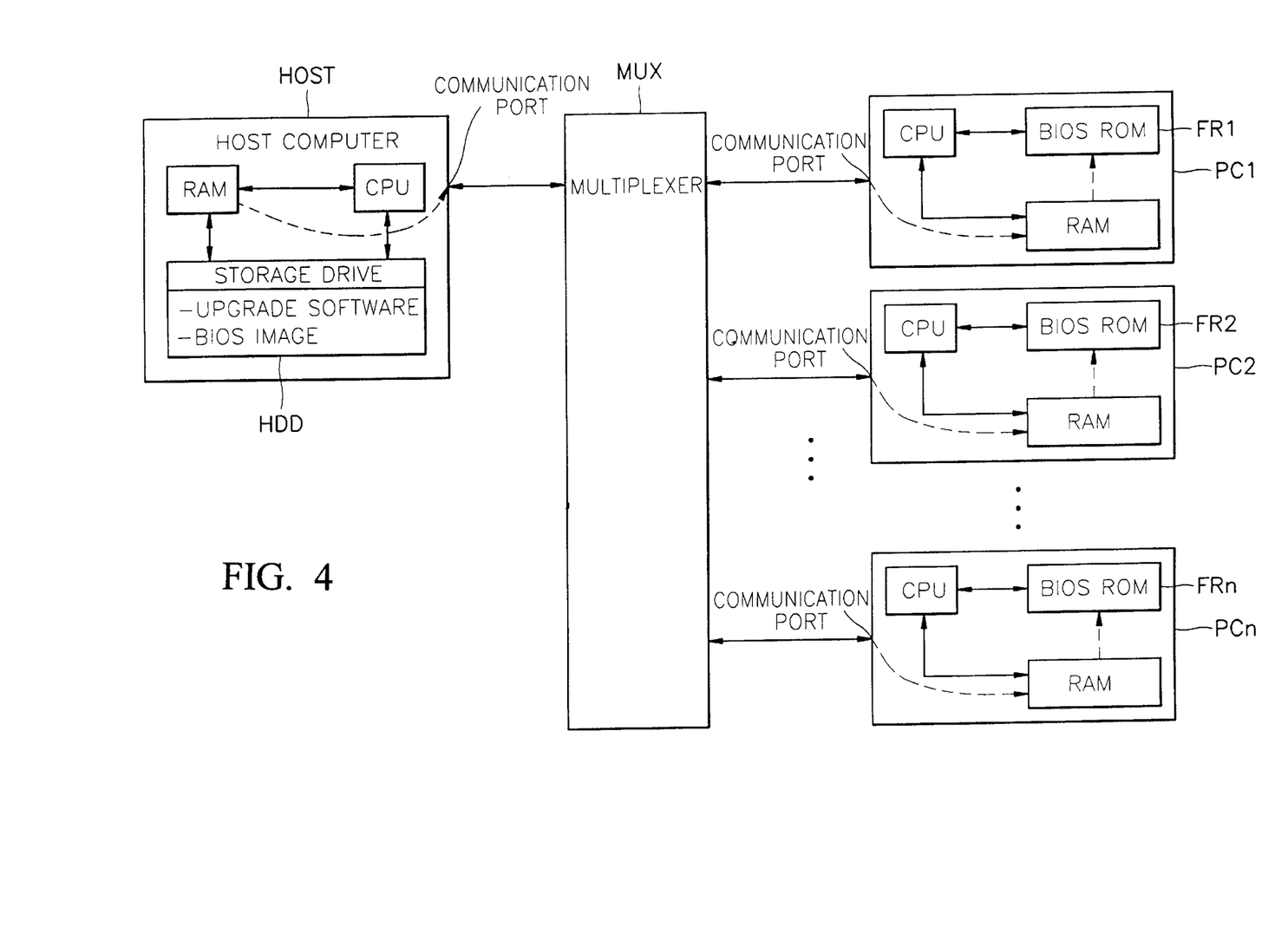
FIG. 4 is a block diagram of a BIOS upgrade system to which a method for upgrading a BIOS using serial communication according to the present invention is applied.

FIG. 4 is a block diagram of a BIOS upgrade system to which a method for upgrading a BIOS using serial communication according to the present invention is applied. The BIOS upgrade system shown in FIG. 4 includes a host computer (HOST) for storing a plurality of upgrade software and BIOS images in a storage device (HDD) and a plurality of personal computers (PC1, PC2, ..., and Pcn) connected to the host computer (HOST) through a multiplexer (MUX) which is a selecting means. Here, the respective personal computers (PC1, PC2, ..., and Pcn) include BIOS ROMs (FR1, FR2, ..., and FRn) in which each BIOS is stored.

The method for upgrading the BIOS using serial communication according to the present invention will be described with reference to the BIOS upgrade system constructed as mentioned above.

In the case where the plurality of personal computers (PC1, PC2, ..., and Pcn) are requested to be upgraded, in the host computer (HOST) the upgrade software and BIOS image of a corresponding personal computer stored in the storage device (HDD) are loaded into the RAM which is a main memory, and are transferred to the concerned personal computer through a multiplexer (MUX) using serial communication.

Meanwhile, in the personal computer which requests the BIOS to be upgraded, the BIOS is upgraded by driving the BIOS software received through the multiplexer (MUX), removing the conventional BIOS stored in a corresponding BIOS ROM, and writing the received BIOS image into the BIOS ROM. Therefore, according to the present invention, it is possible to collectively upgrade the BIOS's of the personal computers requested to be upgraded in short time and to collectively upgrade the BIOS's of a plurality of personal computers.

The above-mentioned method for upgrading the BIOS will be described in detail with reference to FIGS. 5 and 6.

Figure 5:
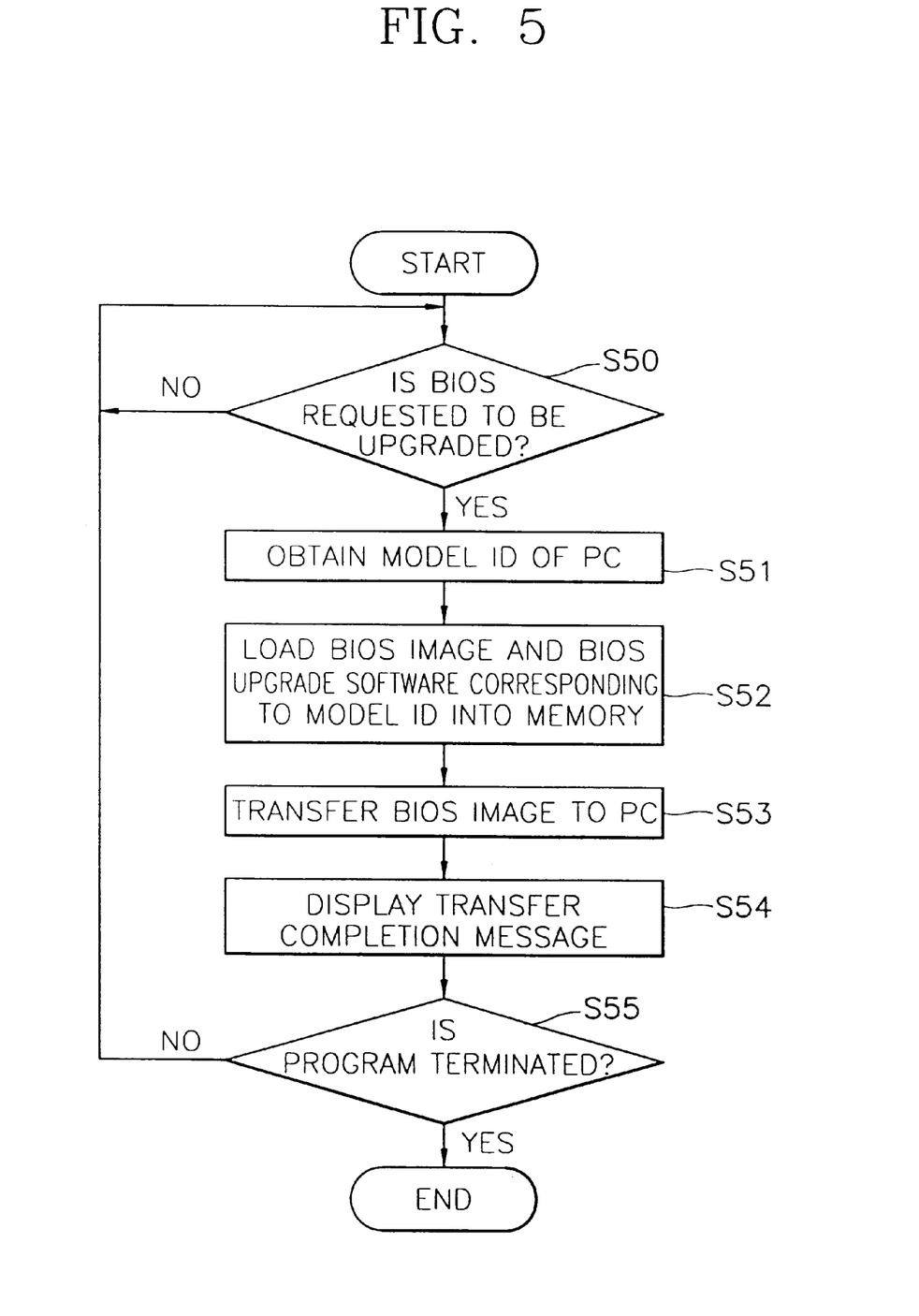
FIG. 5 is a flow chart showing a process of transferring BIOS upgrade software and a BIOS image executed in a host computer in a method for upgrading BIOS using serial communication according to the present invention.

FIG. 5 is a flow chart showing a process of transferring the BIOS upgrade software and BIOS image executed in the host computer in a method for upgrading the BIOS using serial communication according to the present invention.

Referring to FIG. 5, in the process of transferring the BIOS upgrade software and BIOS image executed in the host computer (HOST), in step S50, it is determined whether the BIOS is requested to be upgraded by the personal computer. If not, a continuous check is made as to whether the BIOS is requested to be upgraded. When it is determined that the BIOS is requested to be upgraded during step S50, a model ID is obtained from the personal computer (step S51).

In step S52, the BIOS image and the BIOS upgrade software corresponding to the model ID are read from the storage device (HDD) of the host computer (HOST), and are loaded into a memory. In step S53, the corresponding BIOS image and BIOS upgrade software are transferred to the personal computer which requested the BIOS to be upgraded through the multiplexer (MUX) using serial communication. In step S54, a transfer completion message, announcing that the transfer has been completed, is displayed after completing the transfer. Instep S55, a check is made as to whether the program terminate command of a user is input. If not, the process returns to step S50 to check whether the BIOS is requested to be upgraded. When the program terminate command of the user is input, the program is terminated.

Figure 6:
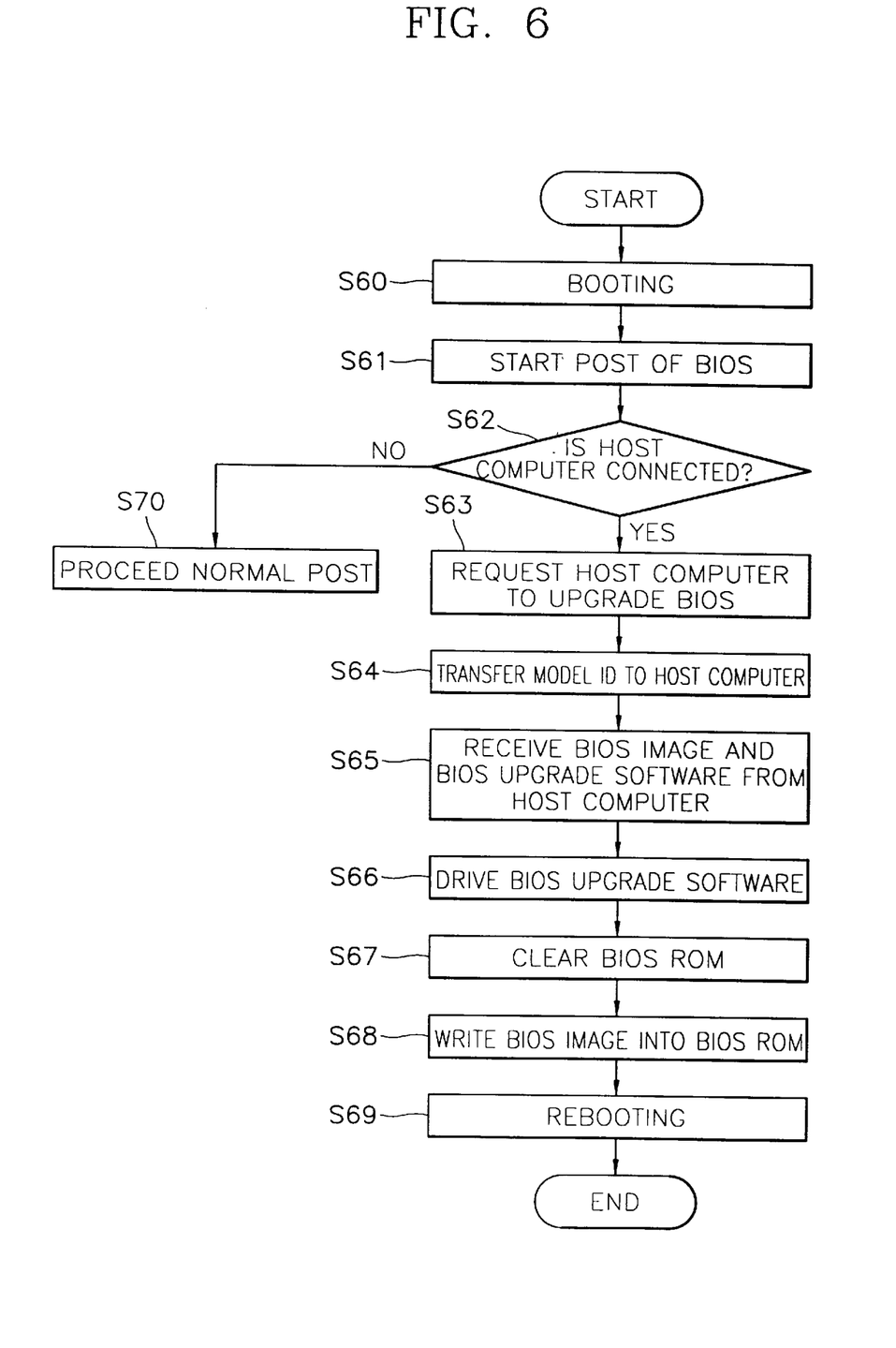
FIG. 6 is a flow chart showing a process of upgrading a BIOS, executed in each personal computer of the respective terminals in a method for upgrading a BIOS using serial communication according to the present invention.

FIG. 6 is a flow chart showing a process for upgrading the BIOS executed in the personal computers of the respective terminals in a method for upgrading the BIOS using serial communication according to the present invention.

Referring to FIG. 6, in the process of upgrading the BIOS executed in the personal computer which requested the BIOS to be upgraded, when the personal computer is booted in step S60, the power-on self-test (POST) of the BIOS is started in step S61. In step S62, a check is made as to whether the BIOS is connected to the host computer (HOST). If not, the process proceeds to step S70 and normal power-on self-test is continued. When it is determined in step S62 that the personal computer is connected to the host computer (HOST), the host computer (HOST) is requested to upgrade the BIOS in step S63. Then, in step 64, the model ID is transferred to the host computer (HOST).

In step S65, the corresponding BIOS image and BIOS upgrade software are received from the host computer (HOST) and are stored in the memory. In step S66, the BIOS upgrade software stored in the memory is driven. In step S67, the existing BIOS stored in the BIOS ROM is removed by clearing the BIOS ROM. In step S68, the BIOS image is written into the BIOS ROM. In step S69, the upgrade is completed by rebooting the computer.

As mentioned above, according to the method for upgrading the BIOS using the serial communication according to the present invention, it is possible to save time and to collectively upgrade the BIOS's of a plurality of computers by upgrading the BIOS of the computer using the serial communication without using a floppy disk.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. In a method for upgrading a BIOS using serial communication between a host computer and a served computer connected to said host computer, comprising the steps of:
   (1) at the served computer, requesting the BIOS to be upgraded;
   (2) at the host computer, transferring predetermined BIOS upgrade software and BIOS image data to said served computer using serial communication when said served computer requests the BIOS to be upgraded; and
   (3) at said served computer, upgrading the BIOS by removing the existing BIOS stored in a BIOS read-only memory ROM and writing said BIOS image data into said BIOS ROM by executing the transferred BIOS upgrade software;
the improvement comprising:
   (a) in the second step in which BIOS upgrade software is transferred, obtaining a model identification of the served computer requesting the BIOS to be upgraded and transferring BIOS upgrade software and BIOS image data to said served computer in accordance with said model identification; and
   (b) in the third step in which the BIOS is upgraded when upgrade is requested transferring said model identification to the host computer.

2. A method for upgrading a BIOS using serial communication between a host computer and a served computer connected to said host computer comprising the steps of:
   (1) at the served computer requesting the BIOS to be upgraded;
   (2) at the host computer, transferring predetermined BIOS upgrade software and BIOS image data to said served computer using serial communication when said served computer requests the BIOS to be upgraded by performing the following steps:
      (a) continuously checking whether the BIOS is requested to be upgraded;
      (b) obtaining a model identification of said served computer requesting the BIOS to be upgraded;
      (c) loading predetermined BIOS images and the BIOS upgrade software corresponding to said model identification into a memory;
      (d) transferring said BIOS images and said BIOS upgrade software to said served computer which requested the BIOS to be upgraded using serial communication;
      (e) displaying a transfer completion message when the transferring step is completed;
      (f) determining whether a program terminate command is input by a user;
      (g) returning to said step of continuously checking whether the BIOS is requested to be upgraded when said program terminate command of the user is not input; and
      (h) terminating the program when said program terminate command of the user is input; and
   (3) at said served computer, upgrading the BIOS by removing the existing BIOS stored in a BIOS read-only memory ROM and writing said BIOS image data into said BIOS ROM by executing the transferred BIOS upgrade software.

3. A method for upgrading a BIOS using serial communication between a host computer and a served computer connected to said host computer, comprising the steps of:
   (1) at the served computer, requesting the BIOS to be upgraded;
   (2) at the host computer, transferring predetermined BIOS upgrade software and BIOS image data to said served computer using serial communication when said served computer requests the BIOS to be upgraded;
   (3) at said served computer upgrading the BIOS by performing the following steps:
      (a) starting a power-on self-test of the BIOS when said served computer is booted;
      (b) determining whether said served computer is presently connected to said host computer;
      (c) proceeding with a general power-on self-test when it is determined that said served computer is not connected to said host computer;
      (d) when it is determined that said served computer is connected to said host computer, requesting said host computer to upgrade the BIOS and transferring a model identification to said host computer;
      (e) receiving BIOS images and the BIOS upgrade software from said host computer and storing them in a memory; and
      (f) removing an existing BIOS stored in a BIOS ROM by executing said BIOS upgrade software and writing said BIOS images into said BIOS ROM.

4. In a method for upgrading a BIOS using serial communication between a host computer and a plurality of served computers connected to said host computer, comprising the steps of:
   (1) providing a multiplexer between said host computer, on the one hand, and said plurality of served computers connected to said host computer, on the other hand;

(2) at the host computer, determining whether any of said plurality of served computers requests a BIOS upgrade from said host computer;

(3) using said multiplexer to select those of said plurality of served computers which have requested said BIOS upgrade, thereby establishing serial communication between said host computer and those of said plurality of served computers which have requested said BIOS upgrade;

(4) at the host computer, transferring predetermined BIOS upgrade software and BIOS image data to said served computers which have requested said BIOS upgrade using serial communication; and (5) at said served computers which have requested said BIOS upgrade, upgrading the BIOS in each of said served computers;

the improvement comprising: in the fourth step of transferring BIOS upgrade software and BIOS image data, obtaining a model identification from each of the plurality of served computers requesting the upgrade and transferring BIOS upgrade software and BIOS image data in accordance with each said model identification.

5. The method of claim 4, wherein said upgrading step comprises removing the existing BIOS stored in a BIOS read-only memory in each of said served computers which have requested said BIOS upgrade, and writing said BIOS image data into said BIOS read-only memory by executing the received BIOS upgrade software.

6. A method for upgrading a BIOS using serial communication between a host computer and a plurality of served computers connected to said host computer, comprising the steps of:

(1) providing a multiplexer between said host computer, on the one hand, and said plurality of served computers connected to said host computer, on the other hand;

(2) at the host computer, determining whether any of said plurality of served computers requests a BIOS upgrade from said host computer;

(3) using said multiplexer to select those of said plurality of served computers which have requested said BIOS upgrade, thereby establishing serial communication between said host computer and those of said plurality of served computers which have requested said BIOS upgrade;

(4) at the host computer, transferring predetermined BIOS upgrade software and BIOS image data to said served computers which have requested said BIOS upgrade using serial communication by performing the following steps:

(a) continuously checking whether the BIOS is requested to be upgraded;

(b) obtaining a model identification from each of said served computers requesting said BIOS upgrade;

(c) loading predetermined BIOS images and the BIOS upgrade software corresponding to each said model identification into a memory;

(d) transferring said BIOS images and said BIOS upgrade software to each said served computer which requested the BIOS to be upgraded using the serial communication;

(e) displaying a transfer completion message when the transferring step is completed;

(f) determining whether a program terminate command is input by a user;

(g) returning to said step of continuously checking whether the BIOS is requested to be upgraded when said program terminate command of the user is not input; and (h) terminating the program when said program terminate command of the user is input; and (5) at said served computers which have requested said BIOS upgrade, upgrading the BIOS in each of said served computers.

7. A method for upgrading a BIOS using serial communication between a host computer and a plurality of served computers connected to said host computer, comprising the steps of:

(1) providing a multiplexer between said host computer, on the one hand, and said plurality of served computers connected to said host computer, on the other hand;

(2) at the host computer, determining whether any of said plurality of served computers requests a BIOS upgrade from said host computer;

(3) using said multiplexer to select those of said plurality of served computers which have requested said BIOS upgrade, thereby establishing serial communication between said host computer and those of said plurality of served computers which have requested said BIOS upgrade;

(4) at the host computer, transferring predetermined BIOS upgrade software and BIOS image data to said served computers which have requested said BIOS upgrade using serial communication by performing the following steps:

(5) at said served computers which have requested said BIOS upgrade, upgrading the BIOS in each of said served computers by performing the following:

(a) starting a power-on self-test of the BIOS when said each of said served computers is booted;

(b) determining whether said each of said served computers is connected to said host computer;

(c) proceeding with a general power-on self-test when it is determined that said each of said served computers is not connected to said host computer;

(d) when it is determined that said each of said served computers is connected to said host computer, requesting said host computer to upgrade the BIOS and transferring a model identification to said host computer;

(e) receiving BIOS images and the BIOS upgrade software from said host computer and storing them in a memory; and (f) removing an existing BIOS stored in a BIOS read-only memory by executing said BIOS upgrade software and writing said BIOS images into said BIOS read-only memory.

8. In an apparatus for upgrading a BIOS using serial communication between a host computer and a served computer connected to said host computer, comprising:

requesting means at the served computer for requesting the BIOS to be upgraded;

transfer means at the host computer for transferring predetermined BIOS upgrade software and BIOS image data to said served computer using serial communication when said served computer requests the BIOS to be upgraded; and upgrading means located at said served computer for upgrading the BIOS by removing the existing BIOS stored in a BIOS read-only memory and writing said BIOS image data into said BIOS read-only memory by executing the transferred BIOS upgrade software;

the improvement comprising;

means for obtaining a model identification of the served computer; and means for transferring to the served computer BIOS upgrade software and BIOS image data corresponding to the model identification.

9. An apparatus for upgrading a BIOS using serial communication between a host computer and a served computer connected to said host computer, comprising:

requesting means at the served computer for requesting the BIOS to be upgraded;

transfer means at the host computer for transferring predetermined BIOS upgrade software and BIOS image data to said served computer using serial communication when said served computer requests the BIOS to be upgraded, said transfer means continuously checks whether the BIOS is requested to be upgraded, for obtaining a model identification of said computer requesting the BIOS to be upgraded, for loading predetermined BIOS images and the BIOS upgrade software corresponding to said model identification into a memory, and for transferring said BIOS images and said BIOS upgrade software to said served computer which requested the BIOS to be upgraded using the serial communication; and upgrading means located at said served computer for upgrading the BIOS by removing the existing BIOS stored in a BIOS read-only memory and writing said BIOS image data into said BIOS read-only memory by executing the transferred BIOS upgrade software;

displaying means for displaying a transfer completion message when the transfer is completed;

determining means for determining whether a program terminate command is input by a user;

said transfer means further adapted for continuously checking whether the BIOS is requested to be upgraded when said program terminate command of the user is not input; and termination means by which said host computer terminates the program when said program terminate command of the user is input.

10. An apparatus for upgrading a BIOS using serial communication between a host computer and a served computer connected to said host computer, comprising:

requesting means at the served computer for requesting the BIOS to be upgraded;

transfer means at the host computer for transferring predetermined BIOS upgrade software and BIOS image data to said served computer using serial communication when said served computer requests the BIOS to be upgraded; and upgrading means located at said served computer for upgrading the BIOS by removing the existing BIOS stored in a BIOS read-only memory and writing said BIOS image data into said BIOS read-only memory by executing the transferred BIOS upgrade software, said upgrade means comprising:

first means for starting a power-on self-test of the BIOS when said served computer which requested the BIOS to the upgraded is booted;

second means for determining whether said served computer is presently connected to said host computer;

third means for proceeding with a general power-on self-test when it is determined that said served computer is not connected to said host computer;

fourth means for requesting, when it is determined that said served computer is connected to said host computer, said host computer to upgrade the BIOS and to transfer a model identification to said host computer;

fifth means for receiving BIOS images and the BIOS upgrade software from said host computer and stores them in a memory; and sixth means for removing an existing BIOS stored in the BIOS read-only memory by executing said BIOS upgrade software and writes said BIOS image into said BIOS read-only memory.

11. In an apparatus for upgrading a BIOS using serial communication between a host computer and a plurality of served computers connected to said host computer, said apparatus comprising:

a multiplexer connected between said host computer, on the one hand, and said plurality of served computers connected to said host computer, on the other hand; and determining means disposed at the host computer for determining whether any of said plurality of served computers requests a BIOS upgrade from said host computer;

wherein said multiplexer selects those of said plurality of served computers which have requested said BIOS upgrade, thereby establishing serial communication between said host computer and those of said plurality of served computers which have requested said BIOS upgrade;

said apparatus further comprising transfer means disposed at the host computer for transferring predetermined BIOS upgrade software and BIOS image data to said served computers which have requested said BIOS upgrade using serial communication; and said apparatus further comprising upgrade means disposed at said served computers which have requested said BIOS upgrade for upgrading the BIOS in each of said served computers;

the improvement comprising:

a means for obtaining a model identification from each of said served computers requesting a BIOS upgrade; and a means for transferring said BIOS upgrade software and BIOS image data to each of said served computers in accordance with each said model identification.

12. The apparatus of claim 11, wherein said upgrading means removes the existing BIOS stored in a BIOS read-only memory in each of said served computers which have requested said BIOS upgrade, and writes said BIOS image data into said BIOS read-only memory by executing the received BIOS upgrade software.

13. An apparatus for upgrading a BIOS using serial communication between a host computer and a plurality of served computers connected to said host computer, said apparatus comprising:

a multiplexer connected between said host computer, on the one hand, and said plurality of served computers connected to said host computer, on the other hand; and determining means disposed at the host computer for determining whether any of said plurality of served computers requests a BIOS upgrade from said host computer;

wherein said multiplexer selects those of said plurality of served computers which have requested said BIOS upgrade, thereby establishing serial communication between said host computer and those of said plurality of served computers which have requested said BIOS upgrade;

said apparatus further comprising transfer means disposed at the host computer for transferring predetermined BIOS upgrade software and BIOS image data to said served computers which have requested said BIOS upgrade using serial communication, said transfer means comprising:
 first means for continuously checking whether the BIOS is requested to be upgraded;
 second means for obtaining a model identification from each of said served computers requesting said BIOS upgrade;
 third means for loading predetermined BIOS images and the BIOS upgrade software corresponding to each said model identification into a memory; and
 fourth means for transferring said BIOS images and said BIOS upgrade software to each said served computer which requested the BIOS to be upgraded using the serial communication;
display means for displaying a transfer completion message when the transfer is completed;
determining means for determining whether a program terminate command is input by a user;
said transfer means further adapted for continuously checking whether the BIOS is requested to be upgraded when said program terminate command of the user is not input;
termination means for terminating the program when said program terminate command of the user is input; and
said apparatus further comprising upgrade means disposed at said served computers which have requested said BIOS upgrade for upgrading the BIOS in each of said served computers.

14. An apparatus for upgrading a BIOS using serial communication between a host computer and a plurality of served computers connected to said host computer said apparatus comprising:
 a multiplexer connected between said host computer on the one hand, and said plurality of served computers connected to said host computer, on the other hand; and
 determining means disposed at the host computer for determining whether any of said plurality of served computers requests a BIOS upgrade from said host computer;
 wherein said multiplexer selects those of said plurality of served computers which have requested said BIOS upgrade, thereby establishing serial communication between said host computer and those of said plurality of served computers which have requested said BIOS upgrade;
said apparatus further comprising transfer means disposed at the host computer for transferring predetermined BIOS upgrade software and BIOS image data to said served computers which have requested said BIOS upgrade using serial communication; and
said apparatus further comprising upgrade means disposed at said served computers which have requested said BIOS upgrade for upgrading the BIOS in each of said served computers, said upgrade means comprising:
 first means for starting a power-on self-test of the BIOS when said each of said served computers is booted;
 second means for determining whether said each of said served computers is connected to said host computer;
 third means for proceeding with a general power-on self-test when it is determined that said each of said served computers is not connected to said host computer;
 fourth means for requesting said host computer to upgrade the BIOS and transfers a model identification to said host computer when it is determined that said each of said served computers is connected to said host computer;
 fifth means for receiving BIOS images and the BIOS upgrade software from said host computer and stores them in a memory; and
sixth means for removing an existing BIOS stored in a BIOS read-only memory by executing said BIOS upgrade software and writes said BIOS image into said BIOS read-only memory.

* * * * *